United States Patent
Jensen

(10) Patent No.: US 7,203,263 B2
(45) Date of Patent: Apr. 10, 2007

(54) CORE SPRAY APPARATUS AND METHOD FOR INSTALLING THE SAME

(75) Inventor: Grant Clark Jensen, Morgan Hill, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/898,181

(22) Filed: Jul. 26, 2004

(65) Prior Publication Data

US 2006/0018421 A1 Jan. 26, 2006

(51) Int. Cl.
*G21C 1/04* (2006.01)
(52) U.S. Cl. ............... 376/352; 376/204; 376/282; 376/292; 138/89; 138/97
(58) Field of Classification Search ........ 376/352, 376/204, 282, 292; 138/89, 97
See application file for complete search history.

(56) References Cited

U.S. PATENT DOCUMENTS

| | | | | |
|---|---|---|---|---|
| 4,138,145 A | * | 2/1979 | Lawrence | 285/23 |
| 4,776,618 A | * | 10/1988 | Barree | 285/341 |
| 5,173,009 A | * | 12/1992 | Moriarty | 405/184.3 |
| 5,912,936 A | * | 6/1999 | Charnley et al. | 376/282 |
| 6,000,731 A | * | 12/1999 | Charnley et al. | 285/319 |
| 6,201,847 B1 | * | 3/2001 | Jensen et al. | 376/352 |
| 6,345,084 B1 | * | 2/2002 | Jensen | 376/352 |
| 6,421,406 B1 | | 7/2002 | Jensen | |
| 6,456,682 B1 | * | 9/2002 | Jensen | 376/282 |
| 6,481,757 B1 | * | 11/2002 | Pao et al. | 285/125.1 |

* cited by examiner

*Primary Examiner*—Ricardo J. Palabrica
(74) *Attorney, Agent, or Firm*—Harness, Dickey & Pierce, P.L.C.

(57) ABSTRACT

A core spray T-box attachment assembly for a core spray nozzle includes a primary cruciform wedge and a secondary cruciform wedge in contact with the primary cruciform wedge to form a cruciform wedge subassembly adapted for insertion within a bore of the core spray nozzle to sealingly engage an interior converging portion of a safe end of the core spray nozzle. The assembly includes a spider in contact with the cruciform wedge subassembly, and a draw bolt engaging an axial bore of a center portion of the cruciform wedge subassembly and the spider to the T-box.

10 Claims, 4 Drawing Sheets

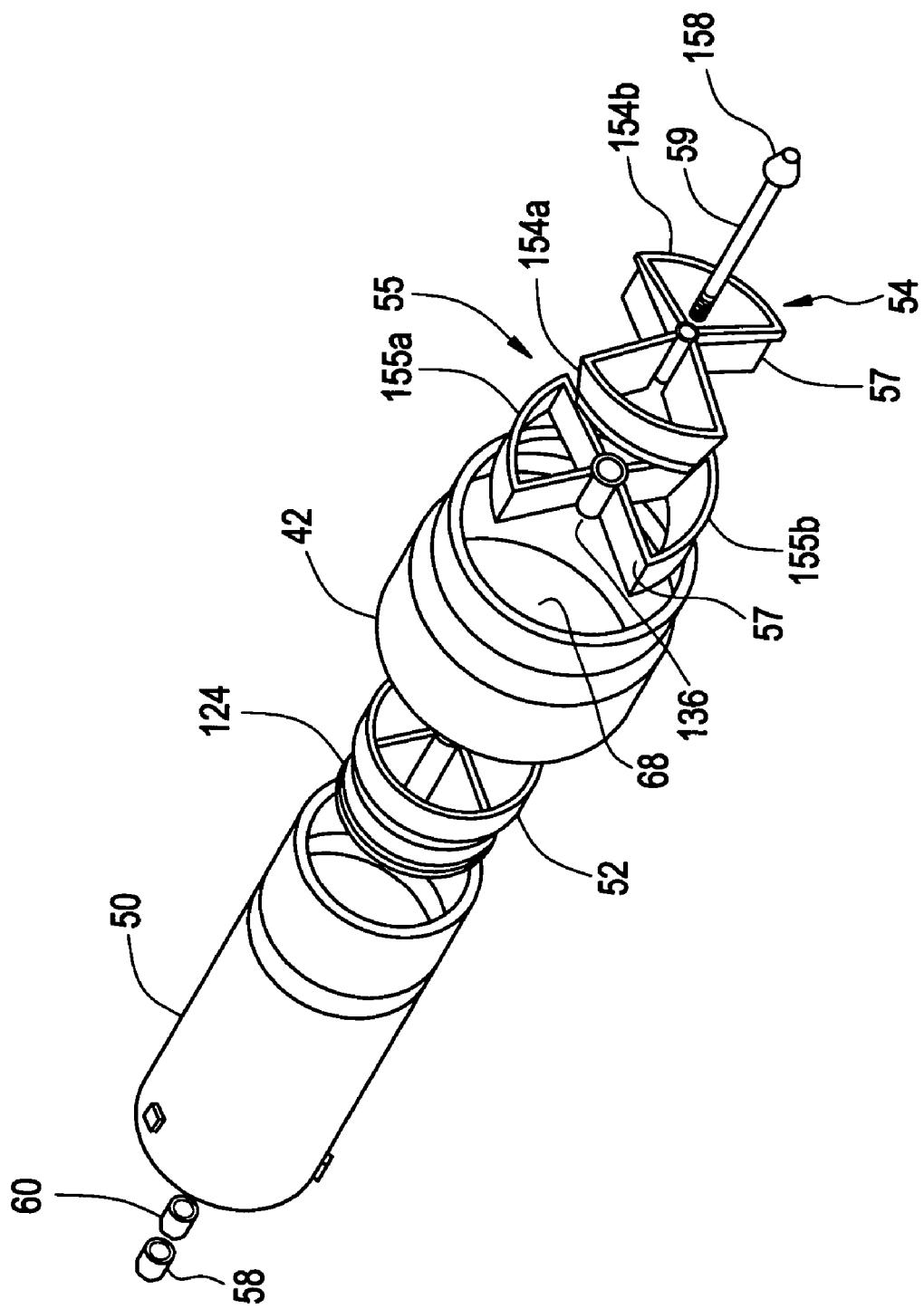

CORE SPRAY APPARATUS AND METHOD FOR INSTALLING THE SAME

BACKGROUND OF INVENTION

1. Field of the Invention

This invention relates generally to nuclear reactors and more particularly, to assemblies and methods for coupling core spray line assemblies within such reactors in a repair.

2. Description of Related Art

A reactor pressure vessel (RPV) of a boiling water reactor (BWR) typically has a generally cylindrical shape and is closed at both ends, e.g., by a bottom head and a removable top head. A core shroud or shroud typically surrounds the core and is supported by a shroud support structure.

Boiling water reactors have numerous piping systems, and such piping systems may be utilized, for example, to transport water throughout the RPV. For example, core spray piping may be used to deliver water from outside the RPV to core spargers inside the RPV and to cool the core. The core spray piping may be coupled to a thermal sleeve which may be slip fit into a RPV nozzle safe end.

Stress corrosion cracking (SCC) is a known phenomenon occurring in reactor components, such as structural members, piping, fasteners, and welds which are exposed to high temperature water. The reactor components may be subject to a variety of stresses. These stresses may be associated with, for example, differences in thermal expansion, the operating pressure needed for the containment of the reactor cooling water, and other stress sources, such as residual stresses from welding, cold working and other inhomogeneous metal treatments. In addition, water chemistry, welding, heat treatment and radiation can influence the susceptibility of metal in a component to SCC.

Reactor internal piping, such as thermal sleeves and core spray lines, may occasionally require replacement as a result of failure due to SCC. Replacing the core spray piping typically may include removing the core thermal sleeve from the RPV nozzle safe end. In the event a safe end requires replacement, the reactor must be shut down for maintenance and drained to an elevation below that of the safe end. The safe end is then removed and a replacement safe end is welded to the RPV nozzle. Thereafter, a replacement core spray line (external to the reactor) may be welded to the replacement safe end. Replacing a safe end is typically time consuming and costly, since such replacement generally requires a lengthy reactor outage of several days to a week or more.

It would be desirable to provide an assembly which facilitates replacing core spray lines without removing the reactor pressure vessel safe end. It also would be desirable to provide such an assembly which is easily removed and installed without the necessity of welding.

SUMMARY OF INVENTION

An exemplary embodiment of the present invention is directed to a core spray T-box attachment assembly for a core spray nozzle. The assembly may include a primary cruciform wedge and a secondary cruciform wedge in contact with the primary cruciform wedge to form a cruciform wedge subassembly adapted for insertion within a bore of the core spray nozzle to sealingly engage an interior converging portion of a safe end of the core spray nozzle. The assembly may include a spider in contact with the cruciform wedge subassembly, and a draw bolt for engaging an axial bore of a center portion of the cruciform wedge subassembly and the spider to the T-box.

Another exemplary embodiment of the present invention is directed to a method of replacing a subassembly (having a T-box and thermal sleeve) within a core spray nozzle of a nuclear reactor. The method may include removing the T-box and thermal sleeve and machining the safe end. Replacement hardware may be inserted therein. The replacement hardware may be configured to create a seal against a converging inner surface of the safe end of a core spray nozzle.

Another exemplary embodiment of the present invention is directed to an attachment assembly. The attachment assembly may include a hollow wedge having a plurality of parts. Each part may be configured to contact a first surface, the attachment assembly may also include a first component configured to pull each of the plurality of parts in a first direction against the first surface; and a second component configured to push against a second surface in a second direction, while pulling the first component in the first direction.

BRIEF DESCRIPTION OF THE DRAWINGS

The present invention will become more apparent by describing, in detail, exemplary embodiments thereof with reference to the attached drawing, wherein like elements are represented by like reference numerals, which are given by way of illustration only and thus do not limit the exemplary embodiments of the present invention.

FIG. 4 is an exploded view of a T-box attachment assembly in accordance with an exemplary embodiment of the invention.

DETAILED DESCRIPTION OF THE EXEMPLARY EMBODIMENTS

Figure 1:
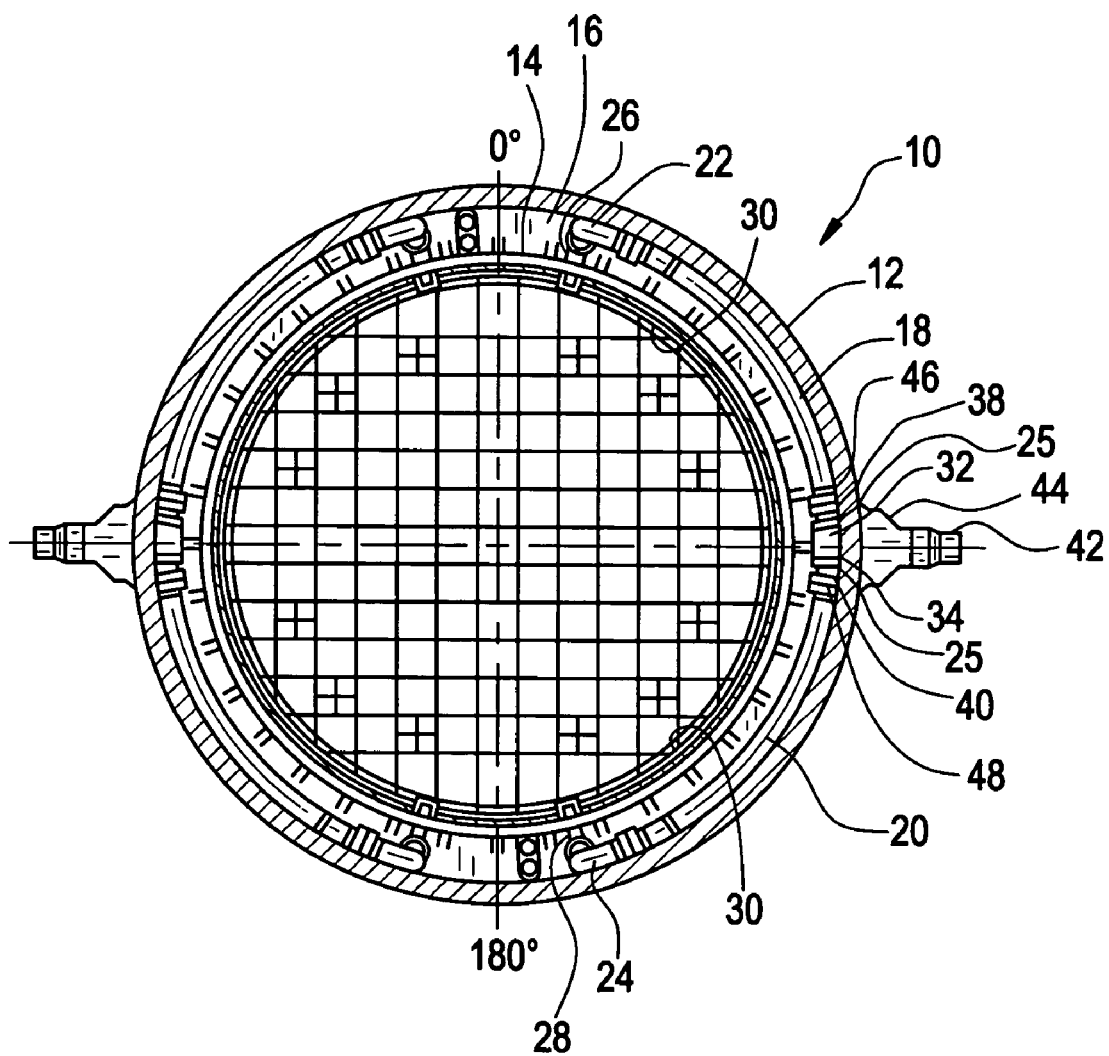
FIG. 1 is an example top plan view of a boiling water nuclear reactor pressure vessel illustrating a T-box attachment assembly in accordance with an exemplary embodiment of the invention.

FIG. 1 is a top plan view of a boiling water nuclear reactor pressure vessel (RPV) 10. RPV 10 includes a vessel wall 12 and a shroud 14 which surrounds the reactor core (not shown) of RPV 10. An annulus 16 may be formed between vessel wall 12 and shroud 14. The space inside annulus 16 may be limited, as most reactor support piping may be located within annulus 16.

In the event of a reactor plant casualty, such as a loss of coolant accident, cooling water is delivered to the reactor core through core spray distribution header pipes 18 and 20, which are connected to respective downcomer pipes 22 and 24. Downcomer pipes 22 and 24 are connected to shroud 14 through respective lower T-boxes 26 and 28, which are attached to shroud 14 and internal spargers 30.

Figure 2:
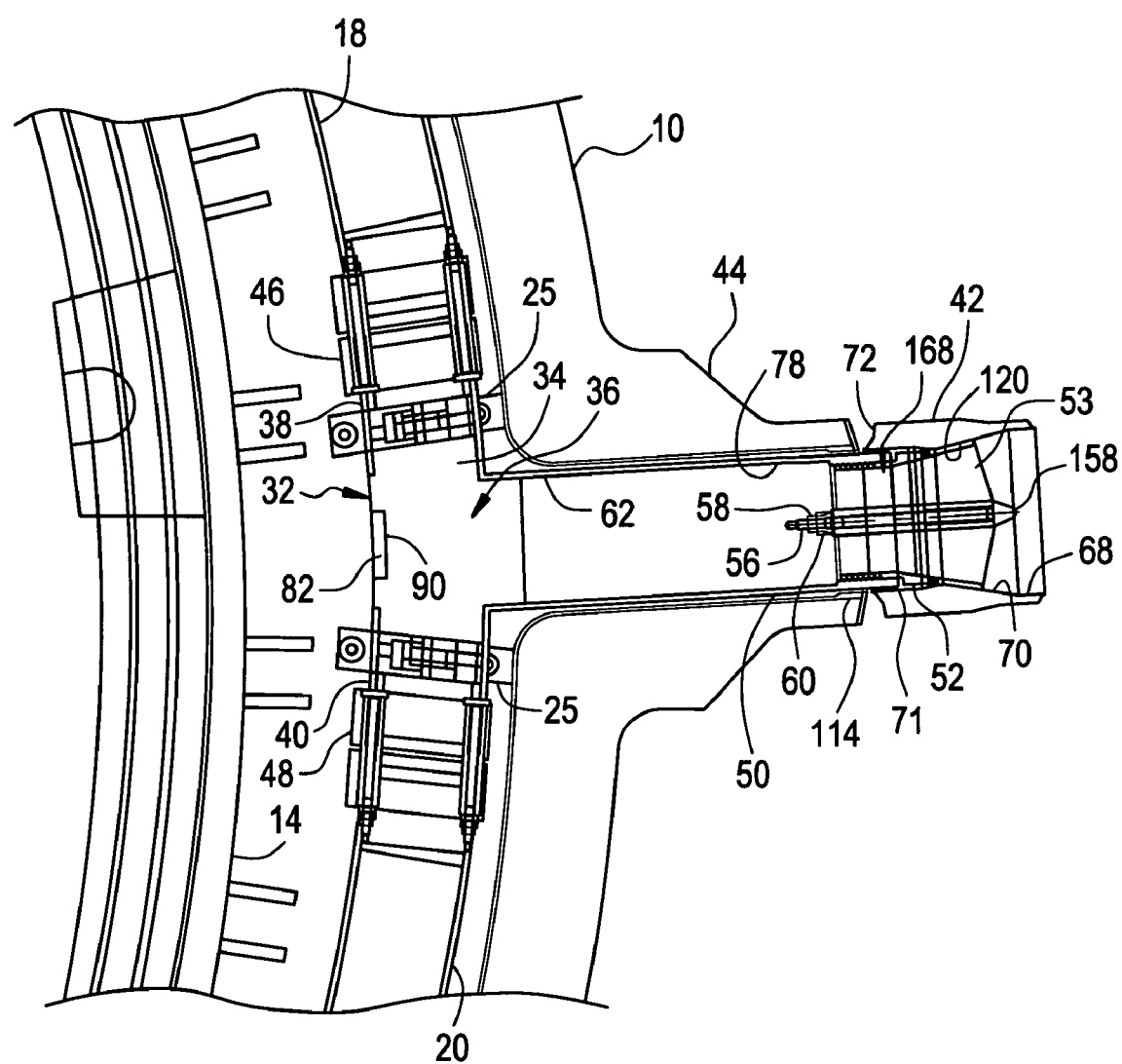
FIG. 2 is an example top sectional view of a T-box attachment assembly in accordance with an exemplary embodiment of the invention.

FIG. 2 is a top sectional view of a T-box attachment assembly in accordance with an exemplary embodiment of the invention.

Distribution header pipes 18 and 20 may diverge from an upper T-box attachment assembly 32. Particularly, T-box attachment assembly 32 may include, in one example, a T-box housing 34 having first, second, and third ends 36, 38 and 40 as shown in FIG. 2. First end 36 of T-box housing 34 is coupled to a safe end 42 of core spray nozzle 44 by a thermal sleeve 50 (shown in FIG. 2). Ends 38 and 40 are configured to be in substantial alignment and configured to couple to core spray distribution header pipes 18 and 20 respectively. Header pipes 18 and 20 are coupled to second and third ends 38 and 40 by pipe connectors 46 and 48 respectively. Pipe connectors 46 and 48 may be any pipe connectors known in the art, for example, ball flange connectors.

Figure 3:
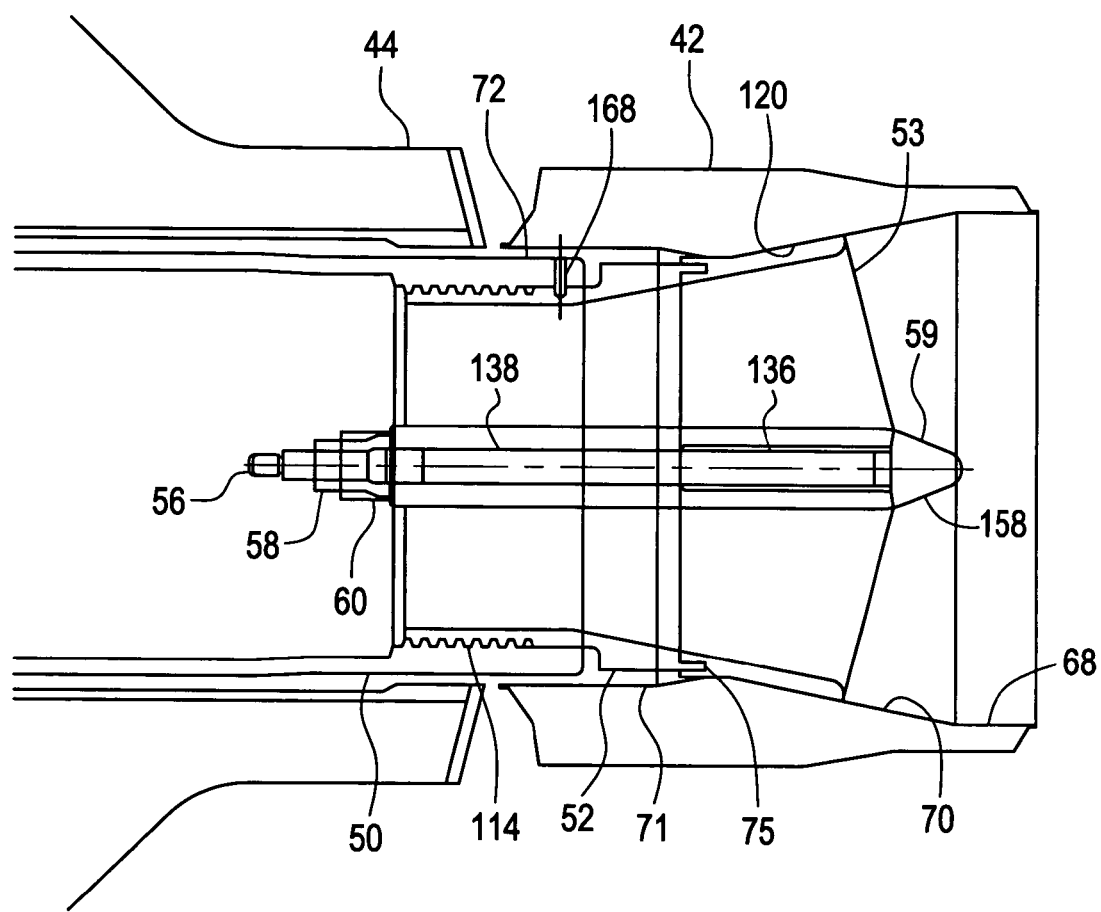
FIG. 3 is a detailed sectional view of a portion of a T-box attachment assembly in accordance with an exemplary embodiment of the invention.

FIG. 3 is a detailed view of a portion of the T-box attachment assembly in accordance with an exemplary embodiment of the invention.

FIG. 4 is an exploded view of the T-box attachment assembly in accordance with an exemplary embodiment of the invention.

Referring primarily to FIG. 3 (with occasional reference to FIG. 2), the T-box attachment assembly 32 includes in addition to T-box housing 34, a thermal sleeve 50, a spider 52, a cruciform wedge subassembly 53, a draw bolt 59, a draw bolt nut 58, and a nut keeper 60.

First end 36 of T-box housing 34 is welded to a first end 62 of thermal sleeve 50. T-box housing 34 is configured to be positioned so that thermal sleeve 50 is located inside core spray nozzle 44 and is fitted to the inside of the spray nozzle safe end 42. For example, safe end 42 includes a safe end bore 68 extending through the safe end 42. Safe end bore 68 includes an inside surface 120 with a converging tapered portion 70 and a diverging tapered portion 71. A second end 72 of thermal sleeve 50 is positioned within core spray nozzle safe end 42. An inner surface of thermal sleeve 50 may include threads 114 at second end 72. T-box housing 34 may also include a cover opening (not shown for clarity) that is in substantial alignment with first end 36, and is configured to receive a T-box cover plate 82.

Referring to FIG. 4, spider 52 may include a cylindrical shell that includes external threads 124 sized to threadedly engage internal threads 114 of thermal sleeve 50. Vanes extend from an inside surface of the spider shell to a spider center member. The spider 52 center member includes an axial spider bore 138 extending through the spider 52. The spider bore 138 may be sized to receive draw bolt 59. The spider 52 may include a tongue or groove to interface with a tongue or groove of the cruciform wedge subassembly 53 to form a tongue and groove joint 75, as generally shown in FIG. 3., for example.

Cruciform wedge subassembly 53 may comprise a plurality of components. For example, the cruciform wedge subassembly 53 may include a primary cruciform wedge 54 and a secondary cruciform wedge 55. The primary cruciform wedge 54 may include a first support member 154a that extends between two web members 57 and a second support member 154b that also extends between two web members 57. The secondary cruciform wedge 55 may include a third support member 155a that extends between two web members 57 and a fourth support member 155b that also extends between two web members 57. The primary cruciform wedge 54 and the secondary cruciform wedge 55 may be joined to make the cruciform wedge subassembly 53. Cruciform wedge subassembly 53 includes a central member having a cruciform central member bore 136 extending, therethrough. The web members 57 of the primary cruciform wedge 54 and the secondary cruciform wedge 55 may be joined together to extend from the central member to form an "X" shaped configuration, for example.

The support members 154a, 154b, 155a and 155b may be joined together to form a contiguous substantially circular support member. The support members 154a, 154b, 155a and 155b may be tapered to engage inside surface 120 of the nozzle safe end bore 68 tapered portion 70. The engagement of the support members 154a, 154b, 155a and 155b of the cruciform wedge subassembly 53 against the inside surface 120 of the nozzle safe end bore 68 tapered portion 70 may function as a mechanical seal to minimize leakage, for example. Additionally, the web members 57 are contoured to minimize flow resistance. Moreover, cruciform wedge subassembly 53 may include a tongue or groove to interface with a tongue or groove of the spider 52 to form the tongue and groove joint 75.

Referring to FIG. 4, a draw bolt 59 may extend through the cruciform central member bore 136 and the spider bore 138. Draw bolt 59 may include a head portion 158 located at a first end. Head portion 158 may be larger than the diameter of the cruciform central member bore 136, and may be conical-shaped to substantially reduce or possibly minimize the conical shape is merely one example, other shapes which would reduce their resistance would be evident to those skilled in the art. A second end of draw bolt 59 is threaded to threadenly engage draw bolt nut 58 (see also FIG. 2). An adjacent section of the draw bolt 59 may have a hexagonal contour that interfaces with a mating hexagonal shaped bore of nut keeper 60 to prevent draw bolt nut 58 from loosening. The nut keeper 60 may be crimped to the outer surface of the draw bolt nut 58, for example.

REPLACEMENT

To replace a core spray line in a nuclear reactor pressure vessel 10, the existing T-box/thermal sleeve combination is removed from the core spray nozzle safe end 42 by any suitable method. The T-box attachment assembly 32 may also be removed from core spray distribution header pipes 18 and 20 (also referred to as "core spray liner") for example, by roll cutting, conventional underwater plasma arc cutting, and/or electric discharge machining (EDM).

A new T-box attachment assembly 32 may be used to connect 18 and 20 to safe end 42 of core spray nozzle 44 by coupling first end 36 of T-box housing 34 to safe end 42 with thermal sleeve 50 and coupling ends 38 and 40 to core spray distribution header pipes 18 and 20. Spider 52 is attached to the second end 72 of thermal sleeve 50 by threadedly engaging spider external threads 124 with thermal sleeve internal threads 114. This threaded connection may provide for ease of fabrication and a means of adjusting the total length of the T-box attachment assembly 32. Once in place, the length of the T-box attachment assembly 32 maybe maintained by installing a dowel pin 168 in the spider 52 and thermal sleeve 50 to prevent relative rotation, as seen in FIG. 3, for example.

Draw bolt 59 is then inserted through the cruciform central member bore 136 of the primary and secondary cruciform wedges 54, 55 and the spider bore 138 (not shown in FIG. 4 for reasons of clarity) with threaded end of draw bolt 59 extending away from safe end 42 and towards T-box housing 34. This may be accomplished by attaching a stainless steel cable or wire rope, of about 3 to 5 millimeters in diameter, (not shown) to the threaded end of bolt 59, and threading the cable through the cruciform central member bore 136 of the primary and secondary cruciform wedges 54, 55 and the spider bore 138 before inserting the primary and secondary cruciform wedges 54, 55 and draw bolt 59 into the safe end 42. The primary and secondary cruciform wedges 54, 55 and draw bolt 59 may then be inserted into safe end bore 68.

The primary and secondary cruciform wedges 54 and 55 are sequentially inserted in an orientation that positions the axis of the cruciform central member bore 136 of the primary and secondary cruciform wedges 54, 55 perpendicular to the axis of the safe end bore 68 of nozzle safe end 42. Primary and secondary cruciform wedges 54, 55 are then tilted so as to move cruciform central member bore 136 into co-axial alignment with the safe end bore 68. The primary and secondary cruciform wedges may then be assembled to form the cruciform wedge subassembly 53 and support members 154a, 154b, 155a and 155b may be pulled to engage the tapered portion 70 of the safe end bore 68.

After the cruciform wedge subassembly 53 has been oriented to its operational position, the wire may be pulled through the cruciform central member bore 136 of the cruciform wedge subassembly 53, which in turn pulls the threaded end of draw bolt 59 through cruciform central member bore 136 and the spider bore 138 into position. The head portion 158 of draw bolt 59 may then engage the cruciform wedge subassembly 53. Draw bolt 59 may be tensioned to fix the cruciform wedge subassembly 53 against the spider in tongue and groove 75. Draw bolt nut 58 is then tightened and nut keeper 60 may be crimped to draw bolt nut 58 to prevent loosening.

Consequently, the cruciform wedge subassembly 53 may be pulled tight against the spider 52. Keeper 60 interfaces with the hexagonal section of draw bolt 59 to prevent rotation of the draw bolt nut 58 relative to draw bolt 59. The positioning of the cruciform wedge assembly 57 and the manipulation of the draw bolt 59 may be accomplished through an access 90 in the T-box attachment assembly 32. T-box cover plate 82 is then inserted to cover the access 90. Core spray distribution header pipes 18 and 20 may then be coupled to ends 38 and 40 of the T-box housing 34. First end 36 may be welded to the first end 62 of the thermal sleeve 50, in order to couple first end 36 of the T-box housing 34 to safe end 42.

Jack bolt clamp assemblies 25 may be attached to ends of the T-box attachment assembly 32 to complete the installation. The jack bolt clamp assemblies 25 may be adjusted to push against an inner surface of the vessel wall 12 in a first direction and pull, in a second direction, the T-box attachment assembly 32 toward the center of the RPV 10. While clamp assemblies 25 may be used to pull the T-box attachment assembly 32, a spreader or wedge may also be used to cause a similar pull to occur. This pulling action helps create a seal between the cruciform wedge subassembly 53 and the converging, inside surface 120 of the nozzle safe end bore 68 tapered portion 70, for example.

The above described T-box attachment assembly 32 may facilitate replacing core spray distribution header pipes 18 and 20 without removing core spray nozzle safe end 42 or draining RPV 10. In addition T-box attachment assembly 32 may facilitate attaching core spray distribution header pipes 18 and 20 to safe end 42 without welding.

While the invention has been described in terms of various exemplary embodiments, those skilled in the art will recognize that the exemplary embodiments of the present invention can be practiced with modification within the spirit and scope of the claims.

What is claimed:

1. A core spray T-box attachment assembly for a core spray nozzle, comprising:
   a primary cruciform wedge;
   a secondary cruciform wedge in contact with the primary cruciform wedge to form a cruciform wedge subassembly having an axial bore adapted for insertion within a bore of the core spray nozzle to sealingly engage an interior converging portion of the core spray nozzle;
   a spider in contact with the cruciform wedge subassembly; and
   a draw bolt engaging the axial bore of the cruciform wedge subassembly and said spider to a T-box.

2. The core spray T-box attachment assembly of claim 1, wherein the primary cruciform wedge includes a first support member and a second support member that extends between web members.

3. The core spray T-box attachment assembly of claim 2 wherein the secondary cruciform wedge includes a first support member and a second support member that extends between said web members.

4. The core spray T-box attachment assembly of claim 1, wherein the spider includes a cylindrical shell having external threads sized to threadedly engage threads of a thermal sleeve.

5. The core spray T-box attachment assembly of claim 1, wherein the spider connects to the cruciform wedge subassembly via a tongue and groove joint.

6. The core spray T-box attachment assembly of claim 3, wherein the first and second support members of the primary and secondary cruciform wedges make up an outer surface of the cruciform wedge subassembly, the first and second support members of the primary and secondary cruciform wedges are tapered to engage an inside surface of a bore tapered portion of a safe end of the core spray nozzle.

7. The core spray T-box attachment assembly of claim 3, wherein the web members of the primary and secondary cruciform wedges extend to form an "X" shaped configuration.

8. The core spray T-box attachment assembly of claim 1, further comprising:
   a clamp assembly to sealingly pull the cruciform wedge subassembly against the interior converging portion of a safe end of the core spray nozzle.

9. The core spray T-box attachment assembly of claim 8, wherein the clamp assembly may be adjusted to push against an inner surface of a reactor vessel wall and pull the T-box attachment assembly toward the center of a nuclear reactor pressure vessel.

10. A core spray T-box attachment assembly for a core spray nozzle, comprising:
    a primary cruciform wedge;
    a secondary cruciform wedge in contact with the primary cruciform wedge to form a cruciform wedge subassembly having an axial bore adapted for insertion within a bore of the core spray nozzle to sealingly engage an interior converging portion of a safe end of the core spray nozzle;
    a spider in contact with the cruciform wedge subassembly; and
    a draw bolt engaging the axial bore of the cruciform wedge subassembly and said spider to a T-box,
    wherein the cruciform wedge subassembly includes an outer circumferential periphery defined by alternating segments of the primary and secondary cruciform wedges.

* * * * *